June 2, 1942.  A. J. SHEEHAN  2,285,232
ELEVATED PARKING SYSTEM
Filed Sept. 30, 1940   4 Sheets-Sheet 1
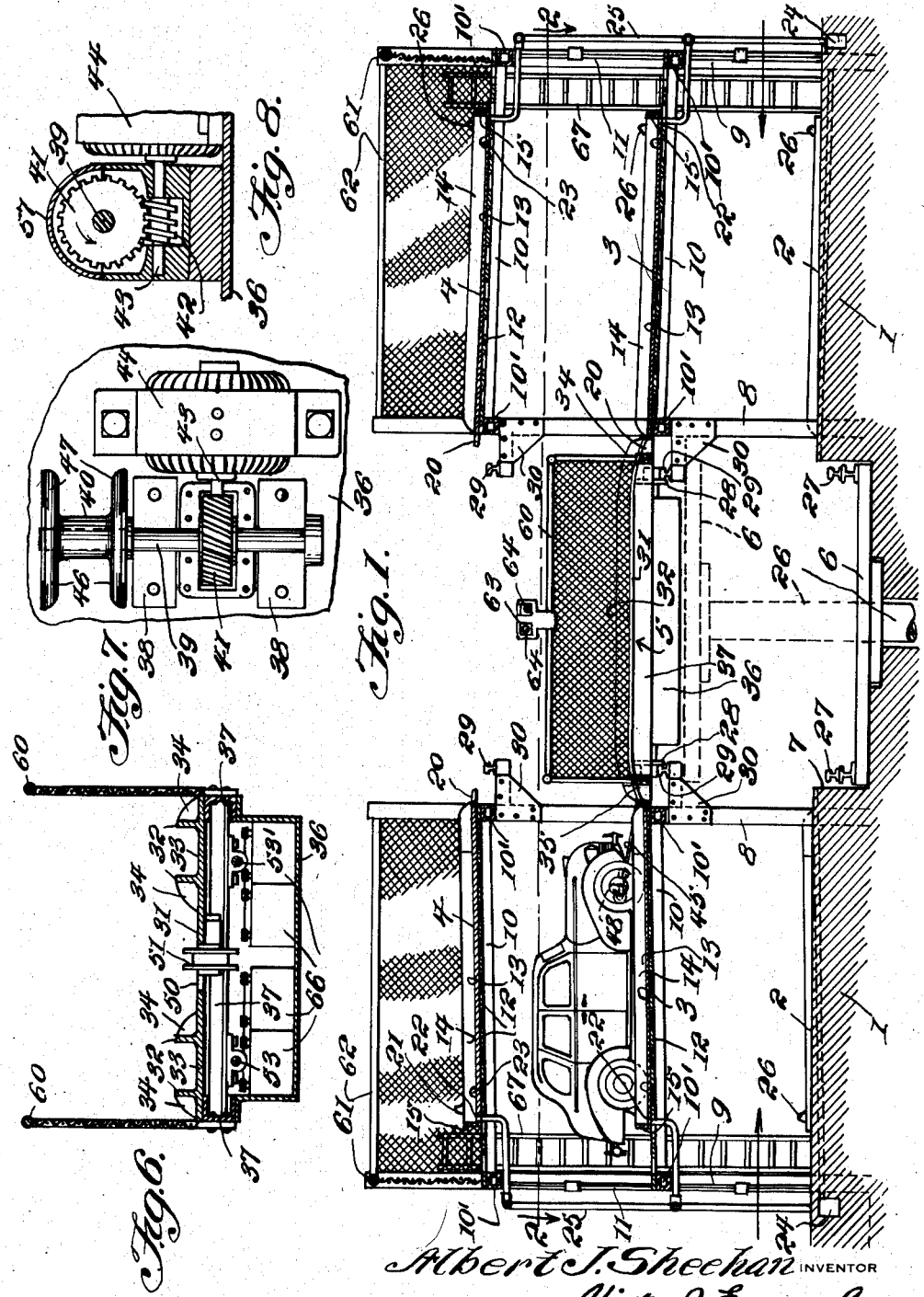
Albert J. Sheehan INVENTOR
BY Victor J. Evans & Co.
ATTORNEYS
WITNESS J.T.L. Wright June 2, 1942.  A. J. SHEEHAN  2,285,232
ELEVATED PARKING SYSTEM
Filed Sept. 30, 1940  4 Sheets-Sheet 2

Albert J. Sheehan, INVENTOR
BY Victor J. Evans & Co.
ATTORNEYS

June 2, 1942.  A. J. SHEEHAN  2,285,232
ELEVATED PARKING SYSTEM
Filed Sept. 30, 1940    4 Sheets-Sheet 3
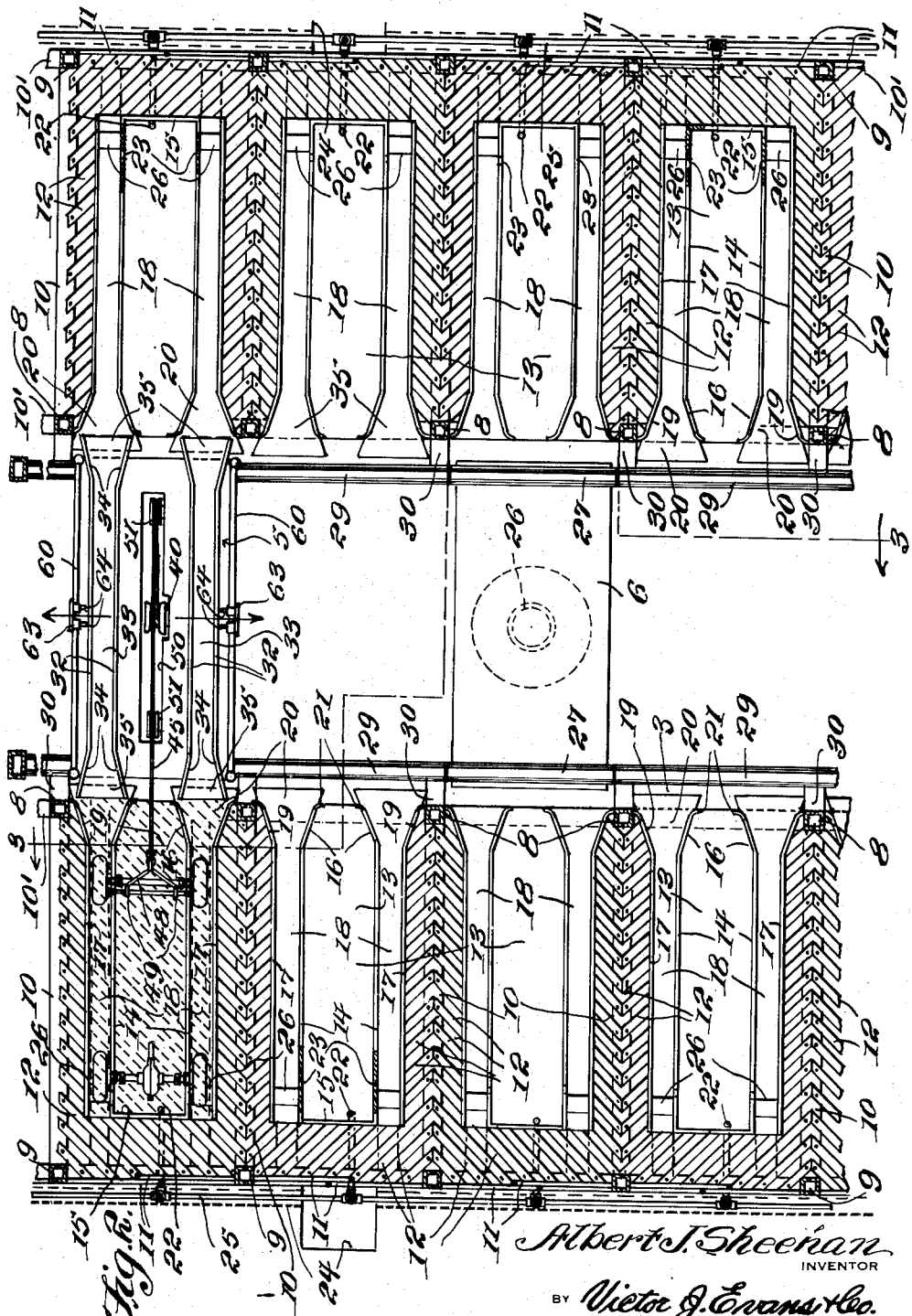
Albert J. Sheehan
INVENTOR
BY Victor J. Evans & Co.
ATTORNEYS

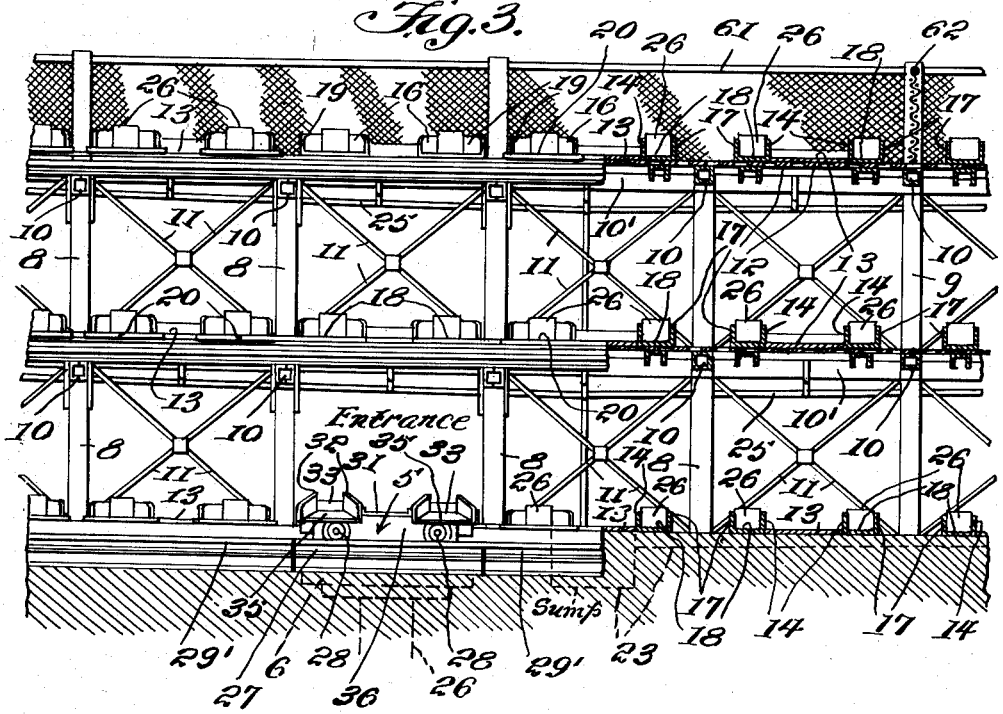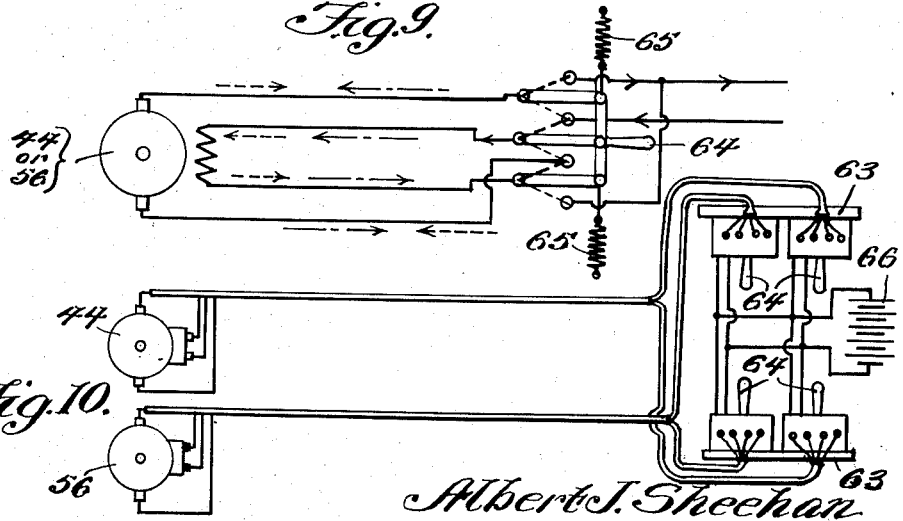

Patented June 2, 1942

2,285,232

UNITED STATES PATENT OFFICE 2,285,232

ELEVATED PARKING SYSTEM

Albert J. Sheehan, San Francisco, Calif.

Application September 30, 1940, Serial No. 359,167

2 Claims. (Cl. 214—16.1)

This invention relates to elevated parking systems, that is to say, to the storage of automobiles at different levels in an apparatus comprising tiers of storage racks or stalls in connection with which a hoist and transfer carriage is provided for lifting the automobiles to the respective levels and transferring them from the hoist to the particular rack or stall where the automobile is to be stored, and, of course, for returning the automobile to the hoist and lowering the same to the ground or base level.

The prime object of the invention is to simplify the structure of the apparatus in general and minimize the original cost as well as the maintenance and upkeep of the apparatus in use.

A further object is to produce a peculiar construction and arrangement of apparatus which will provide maximum storage facilities on minimum ground space and by which construction and arrangement of apparatus the automobiles are handled expeditiously into and out of the storage space of the same without danger to the attendant or attendants or the marring of the finish or otherwise damaging the automobiles.

With the foregoing and other objects and advantages to be attained, as will hereinafter more fully appear, the invention consists in the novel general structure and in the parts and combination and arrangement of parts thereof as hereinafter described and set forth with particularity in the appended claims, reference being had to the accompanying drawings illustrating a practical adaptation of the invention, in which—

Figure 1 is a transverse vertical section through the complete apparatus structure, showing the hoist in its normally lowered position in full lines and in raised position in dotted lines, with the transfer carriage shown in full lines in the position to which it has been raised by the hoist, and an automobile on the storage rack at the left of the transfer carriage and about to be drawn onto the latter by the draft cable which is shown as attached to the automobile for the purpose;

Figure 2 is a fragmentary view partly in top plan and partly in horizontal section taken on or about the line 2—2 of Figure 1;

Figure 3 is a fragmentary view, in longitudinal vertical section, taken on or about the line 3—3 of Figure 2;

Figure 4:
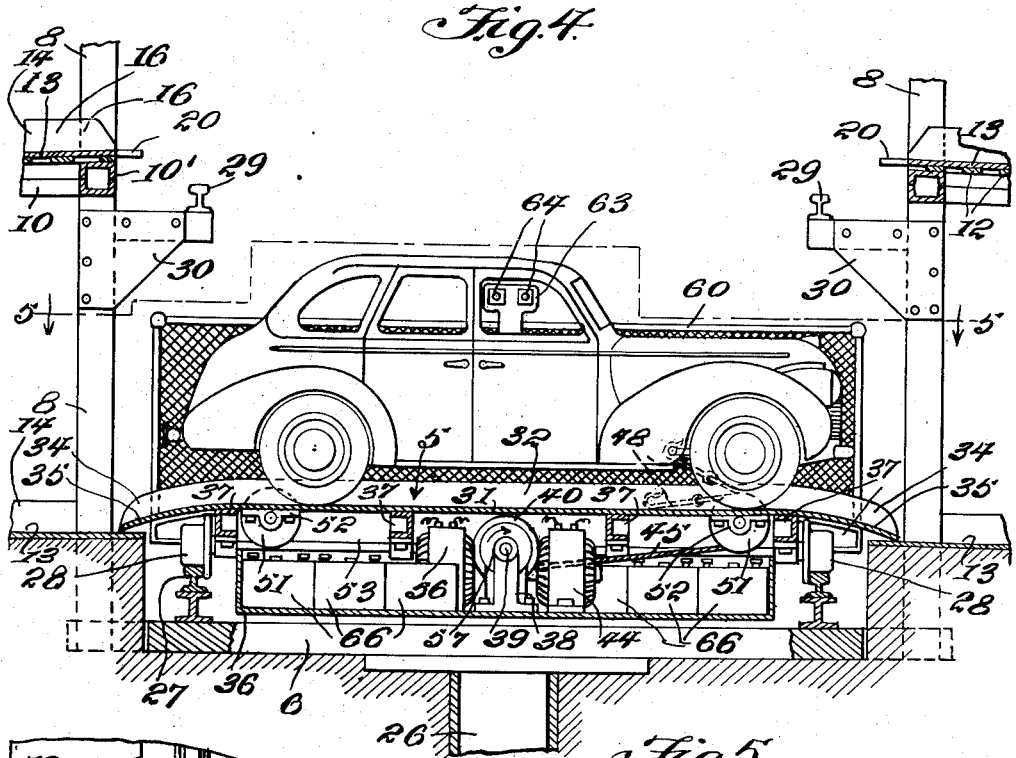
Figure 5:
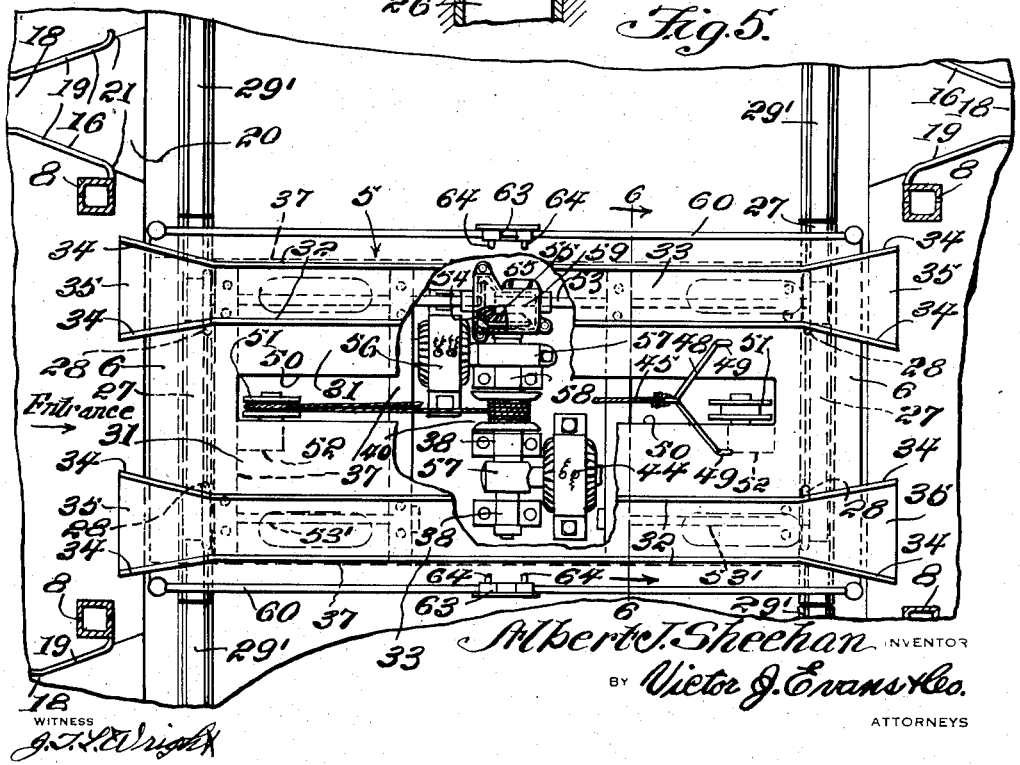

Figure 4 is a fragmentary view, on an enlarged scale, showing the base of the structure in transverse vertical section and adjacent portions of the rack frame structure partly in elevation and partly in cross section, with the hoist and transfer carriage thereon shown in side elevation, and an automobile shown in full lines in a neutral position on the transfer carriage for transportation by lateral travel of the carriage or to be rolled from the carriage onto the storage rack at either end thereof, and a representation of an automobile as being pulled onto the transfer carriage from the storage rack to the left thereof by the draft cable, the hook element of which is indicated by dotted lines as attached to the spreader bar of the vehicle just to the rear of the front axle;

Figure 5 is a horizontal section taken on or about the line 5—5 of Figure 4, with the automobile removed to show the transfer carriage in top plan, a portion of the floor plate of the carriage being broken away to disclose the arrangement of the propelling means of the carriage and the draft cable operating means;

Figure 6 is a cross section of the transfer carriage taken on or about the line 6—6 of Figure 5;

Figure 7 is a fragmentary view showing details of the driving means between the motor and the winch on which the draft cable is wound in the use thereof;

Figure 8 is a fragmentary cross section of the mounting and housing provision for the winch driving means;

Figure 9 is a schematic diagram illustrating a conventional reversing switch and the wiring between the same and one of the reversing motors; and Figure 10 is a schematic view illustrating a duplicate controlling switch hookup whereby the two motors may be controlled from opposite sides of the transfer carriage.

Referring now to the drawings in detail, the numeral 1 designates, generally, the ground level or base portion of the structure of the apparatus, which, as shown, is built with three storage levels, to wit: a ground or base level 2, an intermediate upper level 3, and a top level 4, there being a row of storage racks or stalls at the respective levels 2, 3 and 4 on opposite sides of an aisle in which a transfer carriage 5 travels the length thereof between the two opposed rows or tiers of racks or stalls, said transfer carriage being lifted to the different levels by a hoist 6, which latter, in its normally lowered position, being at the bottom of the longitudinal channel or depression 7 at the bottom of the aisle.

The storage rack structure will now be described more or less in detail. As shown, it comprises inner uprights 8 which extend upwardly from the base 1 adjacent the side walls of the aisle channel or longitudinal depression 7, and outer uprights 9, between which uprights transverse floor beams 10 and longitudinal floor beams 10' are carried, the structure being cross-braced by diagonal stay members 11. Preferably, latticed flooring is secured on the beams 10 and 10', the strips 12 of the flooring being positioned diagonally in laterally spaced relation to each other and in sets in reversed order of angularity so that the flooring is placed with herringbone effect throughout the length of the structure, whereby the flooring strips so placed serve as stiffening braces for the structure. In other words, the flooring strips for each storage rack or automobile receiving stall are inclined in opposite directions to the strips of the adjoining racks or stalls. By this structural provision not only is the frame work materially braced but ample opening is provided for ventilation and prevention of accumulation of rain water.

Suitably secured on top of the flooring strips 12 are sheet metal plates 13 of substantial gauge, said plates being of general rectangular form except at their end portions which terminate with flared lips which extend a short distance beyond the longitudinal inner frame beams 10' and overhang the aisle which accommodates the transfer carriage 5 in its travel between the two opposite rows or tiers of storage racks or stalls. Extending longitudinally of each plate 13, inwardly from the longitudinal margins thereof, is a pair of upstanding flanges 14 which are cross-connected at their outer ends by an upstanding flange 15, said longitudinal flanges 14 having their inner end portions convergent, as at 16. At the extreme longitudinal margins of the plates 13 are upstanding flanges 17, the spaces between said flanges 17 and the inner longitudinal flanges 14 constituting runways 18 for the wheels of the automobile which is placed for storage on a particular rack or stall of the series. The inner end portions 19 of the outer longitudinal flanges 17 are divergent, said portions 19 in opposed relation to the respective convergent portions 16 of the inner longitudinal flanges 14 providing flared guide entrances to the respective wheel runner channels 18. In this connection, it is here noted that the ends of the flange portions 16 and 19 adjacent the extreme overhanging lip portion 20 of the plate 13 are turned in opposite directions, as at 21, at the mouths of the flared entrances to said wheel runner channels 18 so that a free and easy guiding of the wheels into the channels 18 is effected.

The intermediate longitudinal portion of the plates 13 between the inner longitudinal flanges 14 constitutes a drip pan beneath the stored automobile, said pan portion having a drain opening 22 adjacent the outer end thereof and openings 23 being provided in the longitudinal inner flanges 14 whereby the drip pan portion of the plate and the wheel runways 18 are kept free of rain water and oil or other drippings from the automobile, the openings 22 in the drip pan portions of the plates 13 being connected to a take-off manifold or sewer connection 24 by a system of drain piping 25. In this connection, it is here pointed out that direct drainage is prevented at the outer end portions of the wheel runways 18 by wheel chocks 26 which are placed in said runways to arrest and limit the movement of the automobile onto the storage rack or stall. It is further pointed out that the respective floor plates 13 are inclined downwardly from their inner ends to their outer ends, the purpose of which is two-fold, that is to say, not only is ample drainage afforded but the automobile is more expeditiously placed on the rack or stall in that it readily rolls into place down the runways 18 with but slight effort on the part of the attendant in pushing the automobile from the transfer carriage, this inclination of the plate 13 and the runways 18 provided thereon also making it unnecessary to chock the wheels to prevent the automobile from riding off the rack or stall until it is deliberately removed therefrom by the regular process of handling.

Any suitable type of hoist 6 may be provided for lifting the transfer carriage, either loaded or unloaded, and for lowering the same at the will of the operator. However, as conventionally shown, the hoist may be of the ordinary pneumatic or hydraulic lift type, that is to say, it comprises a generally rectangular platform or main body portion which is mounted on a piston stem 26, which latter together with the power cylinder (not shown) and other cooperative adjuncts of the hoist, is capable in its lifting actuation of raising the transfer carriage 5 to the different storage rack or stall levels (in the illustrated structure the levels 3 and 4).

The hoist 6 is provided at the opposite ends of its platform or main body portion with track-rail sections 27 extending the width thereof and in parallel relation to the adjacent walls of the aisle base channel 7, on which flange wheels 28 of the transfer carriage 5 are supported and travel, said trackrails 27 on the hoist 6, in the raised positions of the hoist, being brought into alignment with similar rails 29 which are respectively mounted on angle brackets 30 provided on the uprights 8 of the structural frame of the apparatus and overhang the aisle between the two opposed tiers of storage racks or stalls, said rails 29 extending continuously the entire length of the structure except at the gap where the hoist 6 is located. Similar trackrails 29' are provided in the channeled base portion of the aisle in alignment with the rails 27 of the hoist when the hoist is in its normally lowered position so that the transfer carriage may be shifted from the hoist, so lowered, to place an automobile in any one of the stalls at the ground or base level.

The structural details of the transfer carriage 5 will now be described insofar as may be necessary to a full understanding of the general function and particular operations of the same. As shown, the carriage comprises a generally rectangular body including a main top or floor plate 31 which is provided adjacent and parallel to its longitudinal margins with pairs of spaced parallel upstanding flanges 32 providing runways 33 for the wheels of the automobile placed on the carriage, the flanges 32 being divergent at their outer end portions, as at 34, to provide flared entrances 35 to the runways, said entrance portions 35 being extended some distance beyond the ends of the carriage so as to overhang the adjacent base portions of the apparatus structure and also the extended lips 20 of the floor plates 13 of the storage racks or stalls at the upper levels of the structure. In this connection, it is here noted that the major body portion of the floor plate 31 of the transfer carriage is supported by the flange wheels 28 on the respective trackrails 27, 29 and 29' at a considerable elevation above the floor plates 13 of the respective storage racks or stalls at the base or upper levels, as the case may be, and the entrance portions 35 of the runways 33 which extend and overhang adjacent end portions or lips 20 of the runways 18 of the respective storage racks or stalls are turned downwardly until their extreme edge portions are in close proximity to said lip portions 20 but with sufficient clearance to permit the downturned portions 35 to move freely thereover and without frictional contact therewith.

As shown, the mouths of the entrances 35 to the runways 33 on the transfer carriage 5 are of less width than the mouths of the entrances to the runways 18 of the storage racks or stalls. This is to insure easy and free tracking of the automobile wheels in the movement of the automobile from the transfer carriage onto the storage rack and, due to the downward curvature of the bottoms of the entrances 35 and close proximity of the end edges thereof to the lips 20 of the trackways 18, without sudden drop and bumping of the wheels as they ride off the runways 33 onto the runways 18. The contiguity of the end edges of the entrances 35 of the trackways 33 to the lip portions 20 of the runways 18 also overcomes any tendency of the transfer carriage 5 to tip as the weight of the automobile is brought to bear only on the entrance portions 35 of the runways 33 where they are extended beyond the adjacent track wheels 28 of the carriage.

While, as hereinbefore described, the extended entrance portions 35 of the trackways 33 on the transfer carriage 5 overhang the lip portions 20 of the floor plates 13 of the respective storage racks or stalls and the transfer carriage is movable lengthwise of the aisle between the opposite rows or tiers of storage racks or stalls at the upper levels 3 and 4, it is here noted that the overhanging lips 20 are eliminated at the upper level storage racks or stalls which are directly opposite the ends of the platform of the hoist 6. This is to permit clearance of the projected entrance portions 35 of the runways 33 on the transfer carriage 5 as the carriage is raised and lowered on the hoist. However, while there is no overhang of the entrance portions 35 of the runways 33 when the transfer carriage is positioned on the hoist, there is a close contiguity of the end edges of the runway entrances 35 to the ends of the runways 18 of the storage rack or stall so that the automobile may be rolled off the transfer carriage onto the storage rack with substantially the same facility and advantage as where the extended lips 20 are provided at the mouths of the runways 18 of the storage rack or stall except for the prevention of the tipping of the transfer carriage as just above described. In this connection, however, instead of eliminating the extended lip portions 20 in the immediate region where the hoist 6 is located, it is obvious that the entrance portions 35 of the runways 33 on the transfer carriage may be hingedly mounted so as to be lifted out of the way sufficiently to clear said lip portions while the hoist 6 with the transfer carriage 5 thereon is being raised and lowered. This hinging of the entrance portions 35 of the runways 33 on the transfer carriage being obvious, it is deemed unnecessary to illustrate the same in detail in the drawings.

The floor plate 31 of the transfer carriage except at the downturned entrance portions of the runways 33 is level and horizontal throughout the extent thereof, so that, when an automobile is placed thereon, it is only necessary to apply the wheel brakes of the automobile or to obviously chock the wheels to prevent the automobile from accidentally moving from the transfer carriage, or, obviously, portions of the runways 33 where the wheels of the automobile rest may be slightly depressed. By this provision of the runways 33, the automobile may be driven onto the transfer carriage either from the entrance to the apparatus when the transfer carriage is lowered to the base level or when it is at one of the higher levels to receive the automobile from one of the storage racks or stalls at that particular level. So, too, the construction and arrangement of the transfer carriage is such that an attendant may easily push the automobile from the runways 33 onto the particular rack or stall where the vehicle is to be stored. However, as a part of the present invention, power means under the control of an attendant is provided for moving the automobile from the transfer carriage and for returning it to the carriage from the storage space, as will now be described.

Depending beneath the floor plate 31 of the carriage 5 is a hanger frame 36 which is suspended from the longitudinal and transverse main body frame members 37, which, as shown, are preferably channel sections, and on which the floor plate 31 is supported. Journaled in standards 38 which are mounted on and extend upwardly from the supporting bottom of the hanger frame 36 is a shaft 39, one end portion of which projects beyond the adjacent standard 38 and has a winch drum 40 fixed thereon so as to rotate therewith. Said shaft 39 is provided between the standards 38 with a peripherally toothed gear 41 which is driven by a worm screw 42 fixed on a transverse driving shaft 43, said driving shaft being coupled to the armature shaft of an electric reversing motor 44, by which provision the winch drum may be rotated in opposite directions, at the will of the operator, as will be later more fully described, and by which provision of a worm drive not only is the winch drum 40 so rotated but it is normally held locked against rotation when in any position.

A draft cable 45 is provided for use in connection with the winch drum 40 for the purpose of moving an automobile onto and off the transfer carriage, said cable being obviously provided at one end with a hook member (not shown) which is readily engaged in either one of two apertures 46 which are respectively provided in the opposite flange portions 47 of the drum (see Figure 7). The opposite end of the cable is provided with a substantially Y-shaped double hook element 48 whose pair of hooked end portions 49 are spread a considerable distance apart so as to respectively engage some transverse underframe portion or other part of the automobile of substantial strength to which the element 48 may be conveniently and readily attached and detached and preferably equidistant on opposite sides of the longitudinal axis of the vehicle.

For the accommodation and handling of the draft cable 45 the floor plate 31 of the transfer carriage is provided with a medial longitudinal opening 50 at the opposite ends of which annularly grooved pulleys or shives 51 are located, said elements 51 being journaled in bearings 52 provided therefor on the adjacent underface portions of the floor plate 31 (see Figures 4 and 5). In pulling the automobile onto and off the transfer carriage 5, either one of the two pulleys or shives 51 is utilized, that is to say, the draft cable 45 with its one end hooked in engagement with the winch drum 40 is passed under and about the pulley or shive 51 to be used and thence carried up therefrom and the double hook element 48 then engaged with the under part of the automobile as just hereinbefore described. For example, as illustrated in Figure 1, the draft cable 45 is represented as hooked onto the spreader bar just to the rear of the front axle of the automobile shown on the storage rack to the left of the hoisted transfer carriage 5. With the cable 45 thus attached to the automobile and rotation of the winch drum 40 effected the automobile is thereby drawn onto the transfer carriage to a position at least where its rear bumper or other protrusion is well within the adjacent end limits of the transfer carriage as shown in Figure 4. However, the final positioning of the automobile on the transfer carriage should be centralized as by the illustration of the automobile in full lines in Figure 4. In this movement of the automobile from the storage rack to the left of the transfer carriage, as illustrated in Figure 1, and onto the carriage, as illustrated in Figure 4, the pulley or shive 51 as shown to the right in Figure 4 is the one utilized. Now, if the automobile shown on the transfer carriage as in Figure 4 is to be moved onto the storage rack to the right of the carriage, still utilizing the same pulley or shive 51 the draft cable 45 may be unwound sufficiently from the winch drum 40 so that the double hook element 48 may be carried toward the rear portion of the automobile and fastened to some convenient under part thereof. Thus, by winding the draft cable 45 on the winch drum 40, the vehicle is pulled from the transfer carriage and onto the storage rack to the right of the carriage. It is thus obvious that the draft cable 45 is readily applied to the automobile by an attendant in moving the vehicle onto and off the transfer carriage.

Obviously, the double hook element 48 may be covered with rubber or other suitable padding material to prevent marring of the finish on the automobile body or fenders and even the entire cable may be so covered.

For propelling the transfer carriage power means is preferably provided as shown, said means comprising a common driving axle 53 for one pair of the longitudinally opposed trackwheels 28, said axle 53 having a miter gear 54 fixed thereon in mesh with a corresponding gear 55 fixed on a drive shaft having a gear thereon the same as the hereinbefore described gear 41 which is provided on the drive shaft 39 of the winch drum 40, the said last mentioned gear of the shaft which carries the miter gear 55 being driven by a worm screw corresponding to the hereinbefore described worm screw 42 and being driven by an electric reversing motor 56, said parts 54, 55 and 56 being merely shown conventionally in Figure 5 and the motor 56 alone in Figure 4. In this connection, it is here noted that a suitable housing 57, as shown more clearly in Figure 8, is provided for the worm drives of both the winch drum 40 and the carriage axle 53, the shaft which carries the miter gear 55 being journaled at one end in a standard 58 extending upwardly from the supporting bottom of the hanger frame 36 and at its opposite end in a bearing provided therefor adjacent said miter gear 55 in a gear housing 59. The other pair of trackwheels 28 of the transfer carriage may or may not be power driven like the first mentioned pair, but, as shown, they are mounted on individual axles 53'.

A guard railing 60 is provided at the opposite longitudinal margins of the transfer carriage and a similar railing 61 is provided at the opposite ends and also the outer longitudinal edges of the uppermost storage level 4. So, too, transverse guard railings may be provided at intervals throughout the length of the uppermost level as indicated at 62 in Figure 3, and, within the purview of the invention, any other desirable or necessary safety adjuncts may be provided. It is here also further pointed out that the entrance to the apparatus at the ground or base level may be at either or both longitudinal sides of the structure and either intermediate the ends thereof at one or more places in the length of the structure or only at one end thereof, and the hoist may be even obviously located outside but of course contiguous to the end of the main storage rack or stall structure with a ramp or other runway leading to and from the hoist, in which last mentioned case it will be unnecessary to eliminate any of the projected lip portions 20 of the storage rack or stall floor plates 13 in the entire structure.

Any suitable circuit wiring hook-up and controlling switch arrangement may be provided for the two reversing motors 44 and 56. However, as conventionally shown, two switchboards are provided, one at each side of the transfer carriage, said switchboards, designated generally by the numeral 63, being mounted on the guard rails 60. A circuit diagram which is the same for both motors is illustrated in Figure 9, the circuits being so arranged that when the switch element 64 is in the neutral position shown in Figure 9, in which position it is yieldably held by the two opposed spring elements 65, both of the motor circuits are broken, but when shifted in one direction from such neutral position the switch element closes one of the circuits and when shifted in the opposite direction breaks such circuit and closes the other circuit, and vice versa. In Figure 10 a conventional diagram is illustrated showing the control of both motors 44 and 56 by corresponding pairs of switch elements located on the opposite boards 63, which, as above stated, are mounted on the guard rails 60. As shown, the source of electricity is provided by a plurality of storage batteries 66 which are carried on the hanger frame 36 of the transfer carriage 5. However, the electrical current may be taken from a remote source and supplied to the motors 44 and 56 either by flexible cables which may be obviously wound on reels for automatically taking up the slack in the cables or the current may be supplied by a suitable third rail system or other approved method of such supply.

Access to the upper levels of the apparatus structure may be had by means of ordinary vertical ladders 67, or, obviously, a spiral or other suitable stairway may be provided for the purpose. So, too, it is to be understood that the three-level structure shown in the drawings is for merely illustrating a practical embodiment of the invention and that the number of levels may be increased or decreased, as desirable and practical for the ground space which is available and the maximum number of automobiles to be stored, and while the structure illustrated and herein described embodies a practical adaptation of the invention, it is obvious that considerable further modification than hereinbefore noted is possible within the spirit and scope of the invention as defined by the appended claims. The invention, therefore, is not limited to the specific construction and arrangement shown.

What is claimed is:

1. In an elevated parking system, comprising a number of floors having aisles extending centrally thereof and provided with track rails for each floor level, stalls arranged on each side of the aisle, a hoist located within the aisles between the rows of stalls, tracks carried by the hoist and adapted to form a continuation of the track rails, a transverse carriage having supporting wheels adapted to ride on the track rails of the aisles and the track of the hoist and the upper face of the carriage slightly elevated above the stall level, transverse guide tracks carried by the carriage and having flared downwardly extending open ends, and guide tracks carried by the stalls and terminating close to the guide tracks carried by the transverse carriage, whereby the vehicle is properly guided from the carriage into the stalls.

2. In an elevated parking system, comprising a number of floors having aisles extending centrally thereof and provided with track rails for each floor level, stalls arranged on each side of the aisle, a hoist located within the aisles between the rows of stalls, tracks carried by the hoist and adapted to form a continuation of the track rails, a transverse carriage having supporting wheels adapted to ride on the track rails of the aisles and the track of the hoist and the upper face of the carriage slightly elevated above the stall level, transverse guide tracks carried by the carriage and having flared outer open ends extending beyond the carriage close to the stalls, guide tracks carried by the stalls and having flared ends terminating close to the guide tracks carried by the carriage, and an entrance and an exit opposite the hoist shaft on the ground floor on opposite sides, whereby the vehicle may readily pass onto or off of the carriage from either side.

ALBERT J. SHEEHAN.